United States Patent [19]
Chaffee

[11] Patent Number: 5,684,374
[45] Date of Patent: Nov. 4, 1997

[54] METHOD AND APPARATUS FOR TUNING A MOTION CONTROL SYSTEM HAVING AN EXTERNAL VELOCITY LOOP

[75] Inventor: Mark A. Chaffee, Etna, N.H.

[73] Assignee: Allen-Bradley Company, Inc., Milwaukee, Wis.

[21] Appl. No.: 508,012

[22] Filed: Jul. 27, 1995

[51] Int. Cl.$^6$ .................................................. G05B 13/00
[52] U.S. Cl. ........................... 318/616; 318/609; 388/809
[58] Field of Search ...................... 318/610–612, 318/567, 569, 609, 432, 615, 618, 629, 619, 616, 632; 388/809, 806, 815

[56] References Cited

U.S. PATENT DOCUMENTS

| | | | |
|---|---|---|---|
| 4,498,037 | 2/1985 | Razavi | 318/615 |
| 4,574,227 | 3/1986 | Herder et al. | 318/619 |
| 4,603,284 | 7/1986 | Perzley | 318/632 |
| 4,985,668 | 1/1991 | Nakazumi et al. | 318/567 |
| 5,122,719 | 6/1992 | Bessenyei et al. | 318/629 |
| 5,173,649 | 12/1992 | Wise | 318/615 |
| 5,191,272 | 3/1993 | Torii et al. | 318/609 |
| 5,194,790 | 3/1993 | Niimi | 318/567 |
| 5,223,778 | 6/1993 | Svarovsky et al. | 318/609 |
| 5,331,263 | 7/1994 | Sagae et al. | 318/616 |
| 5,374,882 | 12/1994 | Matsubara et al. | 318/432 |
| 5,475,291 | 12/1995 | Yoshida et al. | 318/610 |

Primary Examiner—John W. Cabeca
Attorney, Agent, or Firm—Patrick S. Yoder; John M. Miller; John J. Horn

[57] ABSTRACT

A method and apparatus for tuning an external velocity loop servo drive of the type including a controller, a command device, an external velocity servo amplifier, an actuator and a position feedback device. The tuning technique include the use of three unidirectional motion events of descending duration. In the first motion event the controller applies a control signal of known amplitude to the actuator and monitors the actuator velocity based upon the position feedback signals. The controller determines the actuator steady state velocity during the motion event and uses this value to determine a scaling factor for the servo amplifier. In a second motion event, the controller drives the actuator in acceleration and deceleration in response to a control signal of known amplitude. Based upon the times at which the actuator reaches certain anticipated velocities, the controller determines system dynamic characteristics. In a third motion event the controller pulses the actuator for a short interval and monitors the actuator velocity to determine the rise time in response to a control signal of known amplitude. The rise time is used to determine the velocity loop bandwidth. The velocity loop bandwidth is then used to tune the position loop gains to appropriate levels.

17 Claims, 7 Drawing Sheets

METHOD AND APPARATUS FOR TUNING A MOTION CONTROL SYSTEM HAVING AN EXTERNAL VELOCITY LOOP

BACKGROUND OF THE INVENTION

The present invention relates generally to the art of electronic motion control systems, especially position control systems. More particularly, the invention relates to a method and apparatus for automatically tuning certain key parameters, such as gains, in a position control system including an external velocity loop for which certain performance characteristics are generally unknown.

A great number of industrial and research applications presently exist for sophisticated positioning systems capable of accurately and repeatably moving machine elements and workpieces at precise speeds to precise locations. Such systems generally include an actuator or servo positioning device, such as a DC motor, and an electronic feedback control system for driving the actuator in response to command signals representative of desired positions of an element directly or indirectly coupled to the actuator. The system may include a single or multiple control axes, each independently controlled by a single controller. Command signals typically originate in a manual or computer interface, such as a computer terminal, while feedback signals are provided by a position sensing device such as a digital incremental encoder. Control circuitry generally includes analog or digital electronics capable of manipulating the input and feedback signals in accordance with a predetermined control routine and developing control signals as dictated by the routine. These control signals are fed to a servo amplifier where they are converted to drive signals for driving the actuator to the desired position and at desired velocity and acceleration rates. Typical applications for such systems vary widely and include industrial robots, machine tools, product assembly stations as well as entire assembly lines.

Control circuitry for many modern position control systems typically includes a microprocessor and associated memory and signal conditioning circuits capable of storing and implementing the system's general control routine, as well as parameters specific to the hardware being driven or positioned. Such digital systems offer distinct advantages over more conventional analog control systems, including their ability to be reconfigured when desired, their part-to-part consistency and their relative insensitivity to environmental conditions that can cause drift and affect predictability in analog systems. Through an encoded series of processing steps implemented through a cyclic sampled data technique, such digital systems effectively model a classical control system, but provide a great deal of flexibility for adapting the routine to the particular needs of a specific application.

Application, or hardware-specific parameters, most often in the form of various system gains, permit control systems of the type described above to be tailored to the physical constraints of the system components and of the elements being positioned, such as the force or torque available from an actuator or the size and weight of the machine elements coupled to the actuator. In one known control system of this type, commercially available under the designation "S Class" motion control systems from the Allen-Bradley Company, a digital microprocessor-based controller is preconfigured to implement a nested digital servo loop control routine for each controlled axis. The controller receives position command and feedback input signals and models a classic position control circuit including position proportional and integral control and velocity feedforward control. Moreover, the system can be set up to model a velocity loop internally or can be configured to implement control based upon an external velocity loop where desired.

Tailoring such systems to a particular application generally requires tuning gain values associated with each parameter on which control is based and for each controlled axis. Which specific gains require such tuning depends upon the control model implemented by the system. These typically include proportional, derivative, integral and feedforward gains. Properly tuning the system gains optimizes system performance while avoiding instability. For example, in the S Class motion control systems mentioned above, increasing proportional velocity gain results in smoother motion, enhanced acceleration, reduced overshoot and greater system stability. However excessive velocity gain may cause high frequency instability. Similarly, increasing proportional position gain decreases response time and increases the "stiffness" of the system, while excessive proportional position gain leads to system instability. Increased integral and feedforward gains reduce steady-state and following errors respectively, but can also degrade system performance and stability if set too high for the system hardware components. The specific gains requiring such tuning depends upon the control model implemented by the system, and typically include proportional, integral and feedforward gains. Where the system models an internal velocity loop, a proportional velocity loop gain may be tuned along with desired position loop gains.

Several approaches are known for tuning system gains in position control systems. Such approaches often employ so-called "auto-tuning techniques" in which the control circuitry determines the optimal level of the system gains with little operator intervention. In one such technique, the system controller tunes velocity and position proportional gains and position integral gain for each controlled axis by progressively incrementing the gain being tuned and driving the actuator bi-directionally along the axis being tuned until a point of instability is detected based upon feedback from the position sensor. The gain is then set at a predetermined fraction of the gain level at which instability occurred. Maximum dynamic capabilities for the drive/motor system, including maximum acceleration, deceleration and speed levels, are measured by driving the system at full scale output using the tuned gains. Feedforward gain may also be tuned by progressively increasing the gain level until following error when running at a constant speed is reduced below a preset threshold. By thus working through each gain for each axis, the controller determines the optimal level of each gain. The tuned gains are stored in memory and are used to generate appropriate control signals each time displacement of the actuator is commanded. The tuning routine is carried out upon initial installation of the system and after replacement or servicing of system hardware.

While such auto-tuning techniques have alleviated the need for complex and time-consuming manual tuning, they are not without drawbacks. For example, in the technique described above, several separate tuning algorithms must actually be run sequentially for each controlled axis. Because the controller drives the actuator bi-directionally and repeatedly for each gain being tuned to identify points of instability, these techniques result in significant movement of the actuator and of the load attached to it. Such movement can result in damage to system hardware. Moreover, in high inertia applications, residual motion at the end of a motion profile may be interpreted by the controller as oscillation (i.e. the instability flag used to identify the upper margin of acceptable gain), resulting in very "soft" gain setting.

As mentioned above, other difficulties arise where such control systems must be tuned to operate as a velocity loop servo system with external components, such as servo amplifiers, the performance characteristics of which are unknown a priori. In such applications, although internal simulation and tuning of a velocity loop as described above is not applicable, conventional auto-tuning routines typically make use of bi-directional motion techniques similar to those described above, locating gain levels resulting in system instability and setting corresponding gains at values below these limits.

SUMMARY OF THE INVENTION

The present invention provides a novel technique for tuning a position control system incorporating an external velocity loop including components whose performance characteristics are unknown, such as analog velocity loop servo amplifiers. The technique advantageously permits a standard controller to be interfaced with a wide range of servo drive devices and the overall system to be tuned in a series of relatively simple tuning steps requiring minimal operator intervention. Tuning preferably requires only three unidirectional, relatively minor motion events to properly tune the velocity loop and position loop gains as well as the system dynamics, resulting in an application-ready control system.

In accordance with a first aspect of the invention, a method is provided for tuning a motion control system of the type including an input device, an actuator, a servo amplifier circuit, a sensor and a controller. The input device generates position command signals, whereas the sensor generates feedback signals representative of a physical element coupled to the actuator. The actuator displaces the physical element to desired locations in response to drive signals from the servo amplifier circuit. The controller is coupled to the input device, the sensor and the amplifier circuit and generates control signals that are convened by the amplifier circuit to drive signals. The servo amplifier circuit implements a velocity control loop and the controller implements a position control loop. In the position control loop at least one parameter error signal derived from the command and feedback signals is multiplied by a gain value. The method includes the steps of applying a control signal at a predetermined level to the amplifier circuit to accelerate the actuator in a predetermined direction and monitoring the feedback signals from the sensor during acceleration of the actuator. A value representative of velocity loop bandwidth is generated based upon the feedback signals and a desired value of the gain is generated based upon the velocity loop bandwidth.

In accordance with another aspect of the invention, a method for tuning a motion control system of the type described above includes the steps of applying a control signal at a predetermined level to the amplifier circuit to drive the actuator to drive the actuator at a steady state velocity and monitoring the feedback signals. A value representative of the steady state velocity is generated based upon the feedback signals and a scaling factor for the servo amplifier circuit is generated from the predetermined level of the control signals and from the steady state velocity value. In a preferred embodiment, the method includes additional steps for determining gain values for the position loop based upon the velocity loop bandwidth determined by analyzing the rise time for the system through an additional motion event. System dynamics, such as maximum acceleration and deceleration rates may be determined through a further motion event.

In accordance with a further aspect of the invention, an apparatus for tuning a motion control system includes a control signal generating circuit coupled to the system amplifier circuit and configured to generate and apply a control signals to the amplifier circuit to accelerate the actuator during a tuning sequence. The apparatus also includes a monitoring circuit coupled to the system position sensor for monitoring feedback signals during the tuning sequence. A signal processing circuit is coupled to the monitoring circuit and is configured to generate a velocity loop bandwidth value based upon the feedback signals monitored during the tuning sequence. The signal processing circuit derives a gain value for use in the position control loop from the velocity loop bandwidth. The gain value thus derived is stored in a memory circuit for use in generating control signals by the system controller.

BRIEF DESCRIPTION OF THE DRAWINGS

The present invention will become more fully understood from the following detailed description, taken in conjunction with the accompanying drawings, wherein like reference numerals refer to like parts, in which:

FIG. 4 (A through C) is a flow chart illustrating steps in typical control logic for implementing the tuning technique of the invention on the motion control system illustrated in FIG. 1 through use of the functional circuits shown in FIG. 3;

DESCRIPTION OF THE PREFERRED EMBODIMENTS

Figure 1:
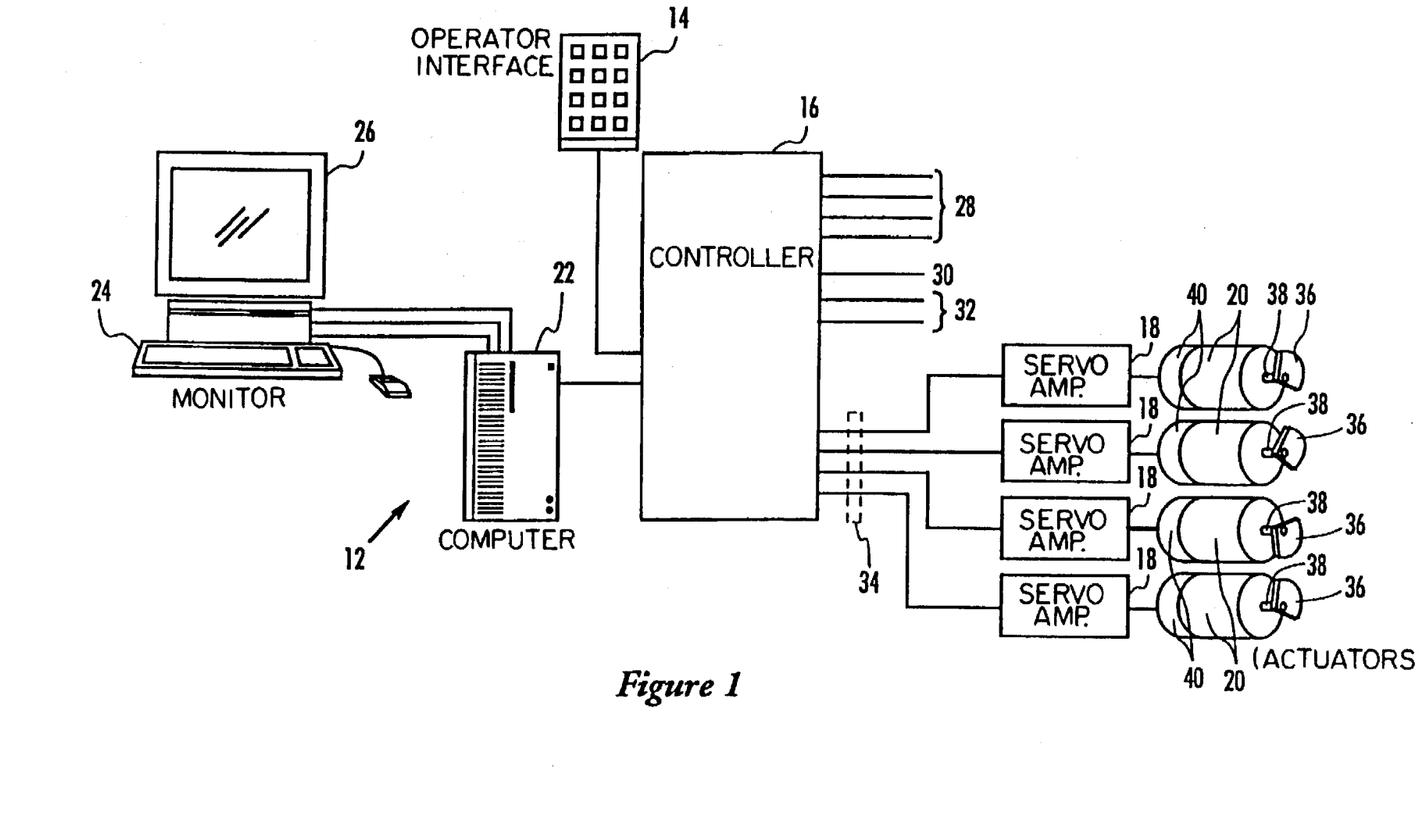
FIG. 1 is a block diagram of an exemplary motion control system in which a tuning technique in accordance with the invention may be implemented.

Turning now to the drawings and referring to FIG. 1, an exemplary motion control system 10 in which the present tuning technique may be implemented is illustrated as including a programming station 12, an operator interface 14, a controller 16, servo amplifiers 18 and actuators 20. As illustrated in FIG. 1, programming station 12 may include a stand-alone or networked computer 22, including a keyboard 24 and monitor 26 for interfacing with controller 16 during the tuning sequence described below as well as during ordinary operation of system 10. Interface 14 may be provided for similar interfacing, including altering control parameters, inputting desired position and velocity values and the like. Controller 16, which will be described in greater detail below, preferably includes a digital signal processing unit for receiving input and configuration commands from station 12 and interface 14 and implementing a predetermined control routine for moving actuators 20. Controller 16 typically includes several axis-specific discrete input/output lines 28 for communicating with external devices (not shown), a processor watchdog connection 30 for monitoring failure of controller 16 and power connections 32 for coupling controller 16 to a source of AC or DC power.

Input/output connections 34 are provided for communicating control signals from controller 16 to servo amplifiers 18 and for receiving feedback signals. Each servo amplifier 18 is coupled to a corresponding actuator 20 for positioning a physical element, represented generally by the reference numeral 36. As will be appreciated by those skilled in the art, actuators 20 may be AC or DC motors, hydraulic or pneumatic cylinders, or any other suitable transducer for converting control or drive signals into displacement of physical elements 36. Moreover, physical elements 36 may include gears coupled to a mechanical drive system, pistons, linkages and the like. Thus, although the following discussion generally refers to physical elements 36 coupled to an output shaft 38 of a motor 20, it should be understood that this discussion merely relates to an exemplary application of the invention. A feedback signal generating device 40 is associated with each actuator 20 and generates feedback signals representative of the position of physical element 36. These feedback signals are communicated to controller 16, preferably through a counter 42 (see FIG. 2).

By way of example only, controller 16 may be of the type available commercially from the Allen-Bradley Company under the designation "IMC S Class Compact" controllers. Such devices typically provide real-time closed loop position control for 2 or 4 axes. A servo amplifier 18, actuator 20 and feedback device 40 are provided for each controlled axis and interconnections between these devices are made via standard cable assemblies. In the presently preferred embodiment, feedback devices 40 are rotary or linear quadrature-type incremental encoders, such as optical encoders, that provide both position and velocity feedback. Encoder counters 42 preferably include optically isolated input buffers, programmable decode logic and 16-bit encoder counters. Counters 42 thus provide precise, absolute position feedback to controller 16 for accurately positioning physical elements 36.

Figure 2:
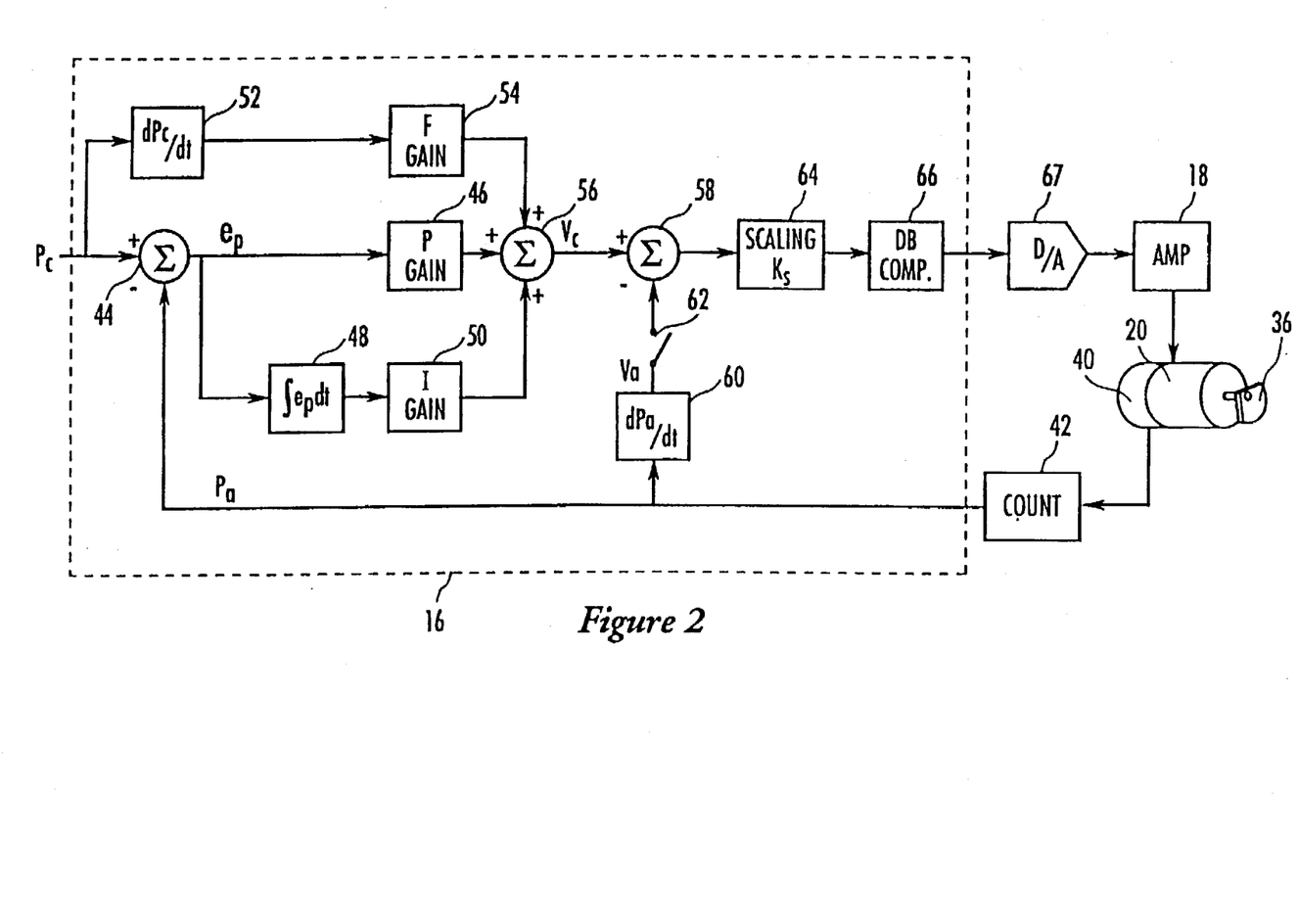
FIG. 2 is a block diagram for a typical control routine implemented by the control system illustrated in FIG. 1.

The present tuning technique may be implemented to tune gain and system dynamics values in a control system routine represented diagrammatically in FIG. 2. It should be understood that while the particular routine described below is preferred, it is presented here by way of example only. The present tuning technique is not intended to be limited to the particular system configuration described. Moreover, while the control routine illustrated in FIG. 2 generally has the same logical structure for each controlled axis, the particular parameters, particularly the position and velocity loop gains discussed below, are typically individually configured, effectively resulting in a set of control routines implemented simultaneously and specifically tailored to each controlled axis.

In the routine depicted in FIG. 2, a position command signal $P_c$ is input from a command device, such as programming station 12 or interface 14. Although the position command signals can be manually input through these devices, in many applications, such as machining and assembly processes, they will typically be developed as part of a larger process control routine. The command signal $P_c$ is combined at a summer 44 with a negative position feedback signal $P_a$ to generate a position error signal $e_p$. Position feedback signal $P_a$ is generated by counter 42 based upon the output of feedback device 40 and is representative of the actual position of physical element 36. Position error signal $e_p$ is multiplied by a position proportional gain $K_{p(pos)}$ at block 46. Position error signal $e_p$ is also applied to an integrating block 48 where the error is summed over successive cycles to determine a time integral of the position error. This integral position error is multiplied by a position integral gain $K_{i(pos)}$ at block 50, and serves to reduce steady state position error due to such factors as static friction. In addition to being summed with the feedback signal $P_a$, the position command signal $P_c$ is applied to a differentiating block 52 where the time derivative of the position command is generated as part of a velocity feedforward loop. The resulting velocity command signal $V_c$ is multiplied by a feedforward gain $K_{ff}$ at block 54.

From blocks 54, 46 and 50, the conditioned error and command signals are summed at a summing point 56. The resulting signal, representative of a velocity command $V_c$, is transmitted to a further summer 58. When the control system illustrated implements an internal, simulated velocity loop or functions as a torque loop servo drive, this velocity command signal is added to a velocity feedback signal $V_a$, generated by differentiating the position feedback signals at block 60. In such cases, this velocity feedback signal is transmitted to summer 58 through a signal transmission path illustrated schematically as including a switch 62 which can be closed to complete the velocity feedback path or opened, as illustrated in FIG. 2 to interrupt the path. Because the present tuning technique is particularly directed to tuning of external velocity loop servo drives, switch 62 is shown in its open position. Opening or closing of the velocity feedback signal path is selected during configuration of controller 16 for each axis prior to actual tuning, as described below.

In the configuration illustrated in FIG. 2, the velocity command signal $V_c$ from summer 58 is multiplied by a scaling factor $K_s$ at block 64 and the resulting signal is added to a deadband offset value at block 66 to obtain a final control signal. In the most general case, for external velocity loop servo drives the gain of servo amplifier 18 will typically be unknown prior to tuning. The present tuning technique permits tuning to proceed without such information and adapts the various signals developed by controller 16 as it implements the control system illustrated in FIG. 2 by normalizing or scaling the velocity command signal $V_c$ to compensate for the inherent gain of servo amplifier 18. The appropriate scaling factor $K_s$ for each axis is determined during the tuning sequence described below. The use of a deadband offset value affords compensation for frictional effects on system 10 when using torque (current loop) servo amplifiers. The resulting control signal is typically range limited to avoid motion of physical element 36 outside the permissible dynamic ranges of system 10 and applied to a digital-to-analog converter 67. Such range limiting typically includes comparing the control signal to signal levels corresponding to known system limits, such as the maximum allowable actuator velocity and maximum acceleration and deceleration rates. Based upon the level of this control signal, converter 67 generates drive signals to drive actuator 40 through servo amplifier 18 in a range of plus-to-minus 10 volts or plus-to-minus 150 mA, depending upon the nature of servo amplifier 18.

Figure 3:
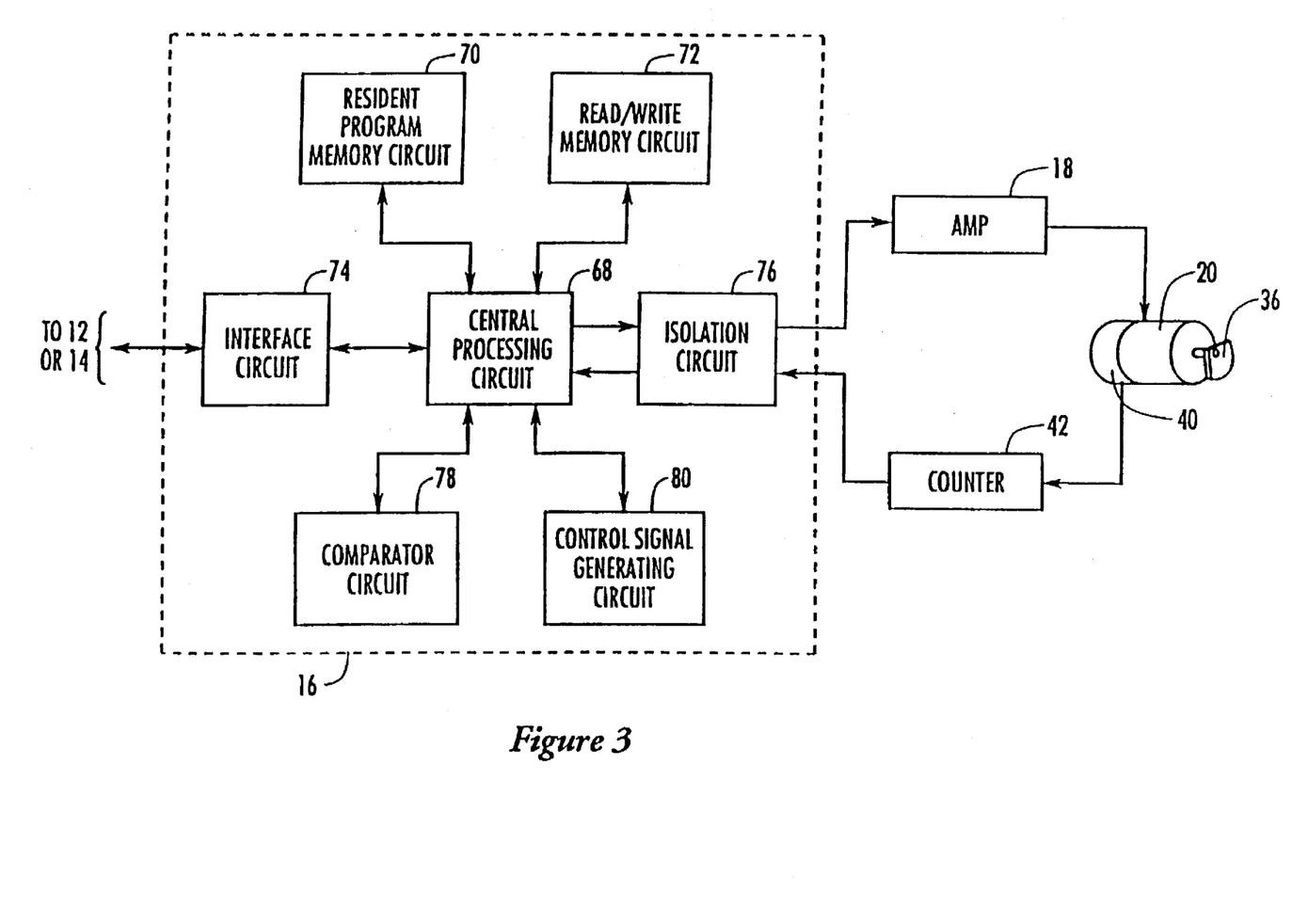
FIG. 3 is a diagrammatical illustration of certain functional circuits included in an apparatus for carrying out the tuning technique in accordance with the invention.

Certain of the functional circuits comprising controller 16 for carrying out the control routine summarized above are represented schematically in FIG. 3. As shown in FIG. 3, a central processing circuit 68 includes internal circuitry, typically defined during configuration or programming of circuit 68 for carrying out a cyclic control murine through execution of encoded logic. A resident program memory circuit 70 permanently stores the control routine, while a read/write memory circuit 72 temporarily stores parameter values needed for execution of the control routine. To permit tuned values to be semi-permanently stored for use in the control routine but reconfigured if desired, memory circuit 72 preferably includes non-volatile memory for storing such values, such as EPROM or EEPROM.

In operation, central processing circuit 68 receives command signals from programming station 12, interface 14 or any other suitable command signal source through an interface circuit 74. Feedback signals from device 40 are also applied to central processing circuit 68 through an appropriate isolation circuit 76. Central processing circuit 68 cycles through the control routine stored in memory circuit 70 and, based upon the command and feedback signals received, performs the signal comparisons summarized above in a comparison circuit 78 to determine position error values. Using these error values, the command and feedback signals, and the tuned gain and system dynamics values, central processing circuit 68 calls upon a control signal generating circuit 80 in accordance with the control routine, to produce control signals to be converted by converter 67 and conditioned by servo amplifier 18. In response to the control signals, servo amplifier 18 generates drive signals for moving actuator 20 and thereby physical element 36, to reduce the error signals to zero. These functional circuits may be substantially identical to those presently found in known position control systems, such as the IMC S Class Compact controllers mentioned above.

Figure 4A:
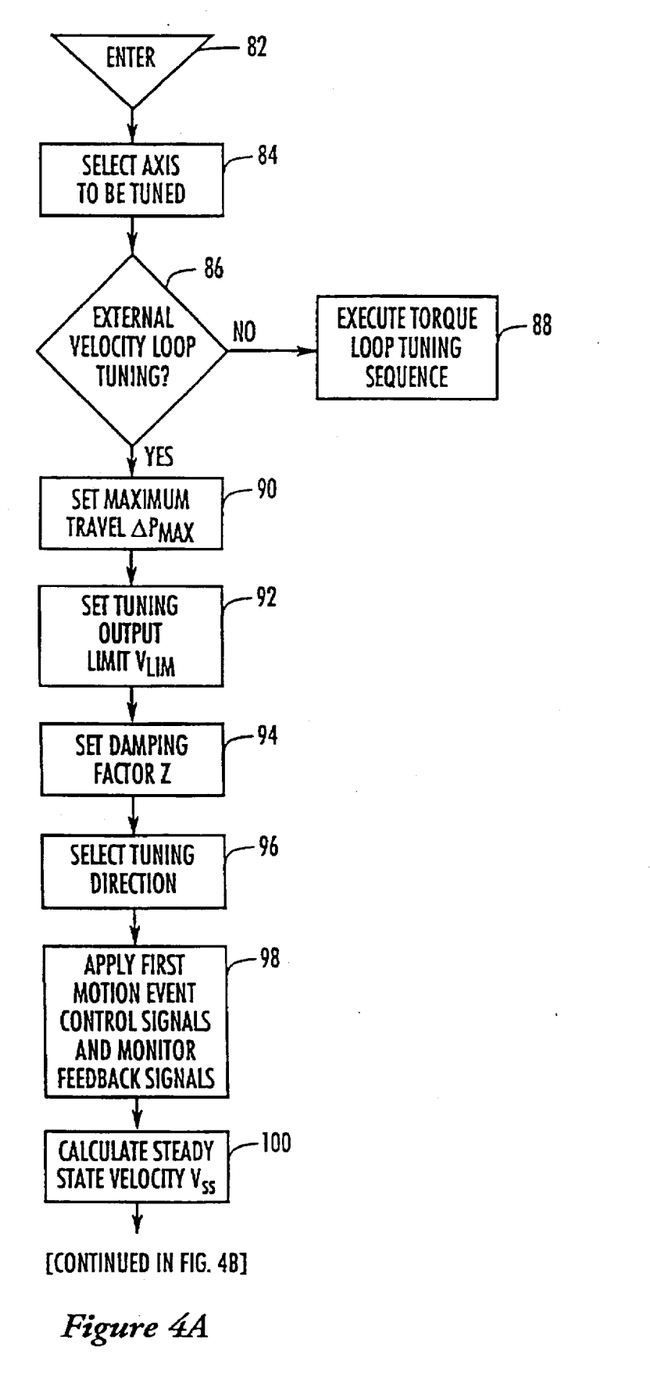
Figure 4B:
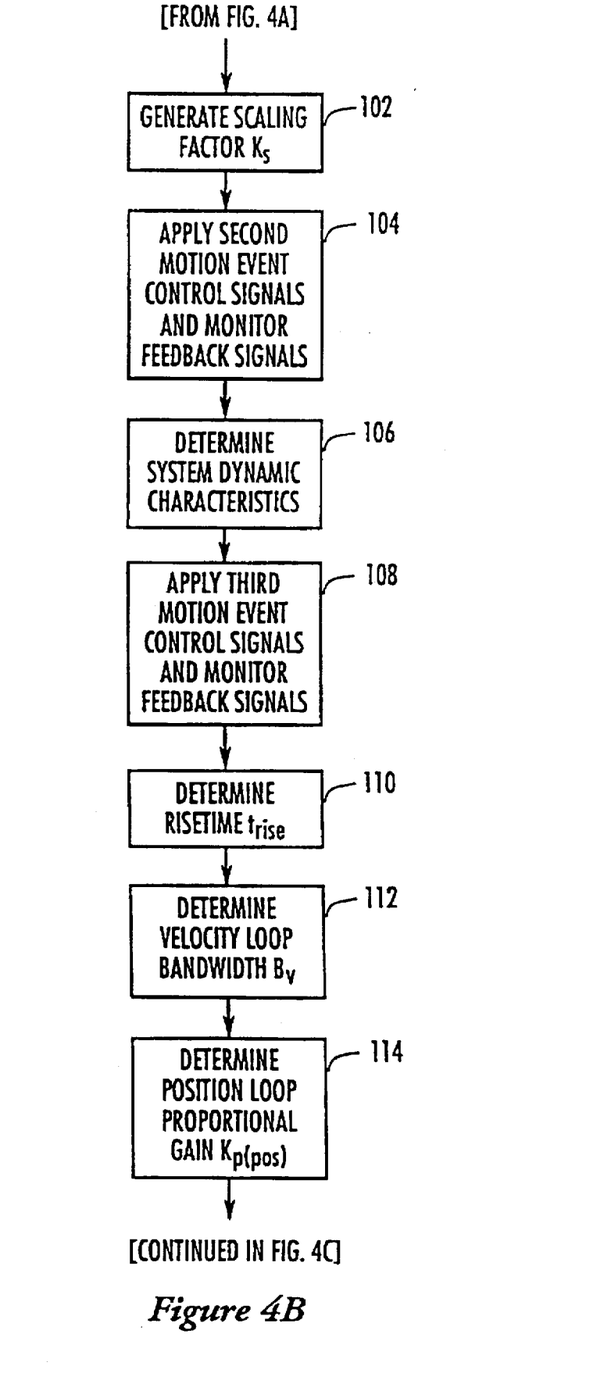
Figure 4C:
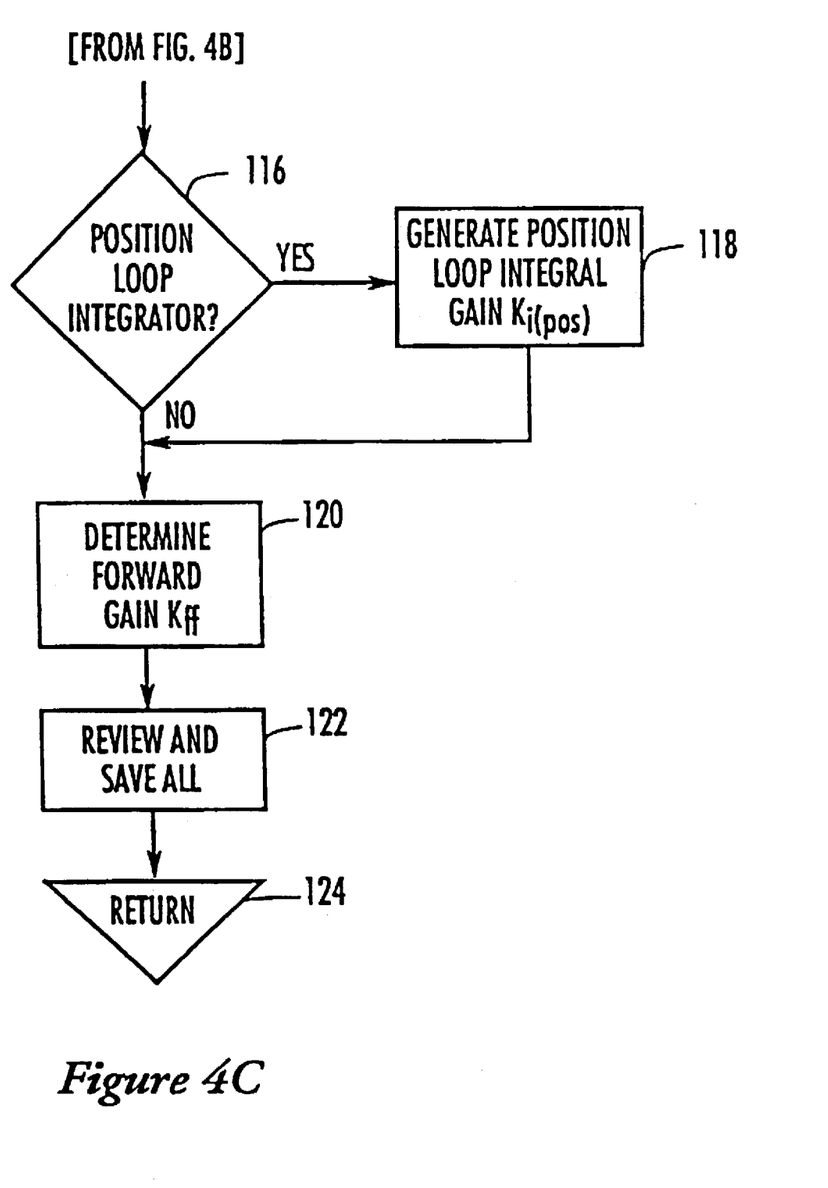

The present tuning technique permits key parameters used by the functional circuitry discussed above, particularly system gains and dynamic parameters, to be simply and easily set at optimal levels. FIGS. 4A, 4B and 4C summarize typical control logic for carrying out this tuning technique for a motion control system such as that described above. Such logic will ordinarily be incorporated in an appropriately configured (programmed) controller 16, and is conveniently stored in resident program memory circuitry 70. Moreover, various operator interfaces may be envisioned permitting interactive control of the tuning sequence and programs incorporating such interfaces may be stored in computer 22 of programming station 12. The presently preferred interface is a mouse-driven setup interface supported on an Intel 486 personal computer platform.

Throughout the following discussion, several important advantages of the tuning technique should be noted. A first advantage resides in the use of a series of unidirectional motion events to gather the information needed to scale controller 16 to servo amplifier 18, to determine system dynamic parameters such as maximum acceleration and deceleration rates, and to tune system gains. Moreover, by drawing upon key relationships between the velocity and position loops of the system, particularly between the bandwidths of the velocity and position loops, the tuning sequence permits optimal tuning of all necessary parameters through a straightforward set of calculations carried out by the controller circuitry. In addition, because the system dynamic parameters are determined based upon one of the motion events included in the tuning sequence, very little information need be known by the system operator prior to tuning. In the preferred embodiment described below, only the drive type (i.e. velocity or torque) and the maximum allowable velocity (or the percentage of the full output range useable by the drive) need be supplied by the operator. All other necessary parameters are either assumed by the system or determined during the tuning sequence.

As illustrated in FIG. 4A, the tuning sequence begins by entering a servo setup menu at block 82. At step 84, the operator is prompted to select the particular control axis to be tuned. As described above, control system 10 may implement control routines for several control axes simultaneously, with each axis having an independently commanded actuator coupled to a servo amplifier and a position sensor for producing position-indicative feedback signals. Thus, based upon the selection made at step 84, where gains and dynamic parameters for several different control axes are being tuned, the following steps will be performed for each axis. At step 86, the operator is asked whether the servo amplifier 18 of the axis being tuned is being programmed as an external velocity loop servo drive or as a torque loop servo drive. As discussed above, for systems configured to operate as an external velocity loop servo drive, controller 16 typically interfaces with servo amplifiers whose performance characteristics are unknown a priori to the controller. On the other hand, providing the option for configuring the control system as a torque loop servo drive permits the same controller to implement a control routine that simulates a velocity loop and conditions position feedback signals to simulate an external tachometer. If the axis is not being tuned as an external velocity loop system, a torque loop tuning sequence is executed at step 88. However, as the torque loop tuning sequence does not form part of the present invention, it will not be discussed in detail. It should be noted that as subsequent controlled axes are tuned, responses to the query at block 86 may differ, resulting in certain axes being tuned and controlled as torque loop servo drives while other axes are controlled as external velocity loop servo drives.

Beginning at step 90, parameters related to particular constraints of the system elements are selected. At step 90, the operator is prompted to select the maximum allowable displacement or travel during the tuning sequence. Controller 16 uses this value as a physical constraint in generating the control signals for the motion event as described below. At step 92, the operator is prompted to select a maximum allowable tuning velocity $V_{lim}$ of the selected axis. While, as mentioned above, no specific information relating to the performance characteristics of the drive, the actuator, or the feedback device need be known to proceed through the following tuning sequence, step 92 permits the operator to select a velocity limit that may be based on either actual limitations of the drive or a velocity limit preferred by the operator due, for example, to the nature of the physical elements being displaced along the axis. In the preferred embodiment, the output limit $V_{lim}$ is selected as a percentage of the output range (e.g. in volts) of controller 16. Other overall system dynamics capabilities, including maximum acceleration and deceleration rates are determined based upon the system performance during the motion events described below.

At step 94, a damping factor Z is selected. In the preferred embodiment, a default value of 0.8 is used for Z, although values between 0.7 and 2.0 may be selected. The damping factor Z, used in the gain calculations described below, effectively determines the aggressiveness of the control system in responding to command signal changes, a higher value generally resulting in a slower response or a "sluggish" system and a lower value generally resulting in a rapid or "hotter" response. Finally, at step 96, the operator is prompted to select a direction for the motion events commanded during the tuning sequence. As mentioned above, the present tuning technique requires only unidirectional motion events to determine key parameters required for system tuning, as opposed to multiple oscillatory (i.e. bidirectional) motion events used in previous external velocity loop position control system tuning approaches. Therefore, at step 96 the operator may choose the most convenient direction of motion for the actuator.

Figure 5:
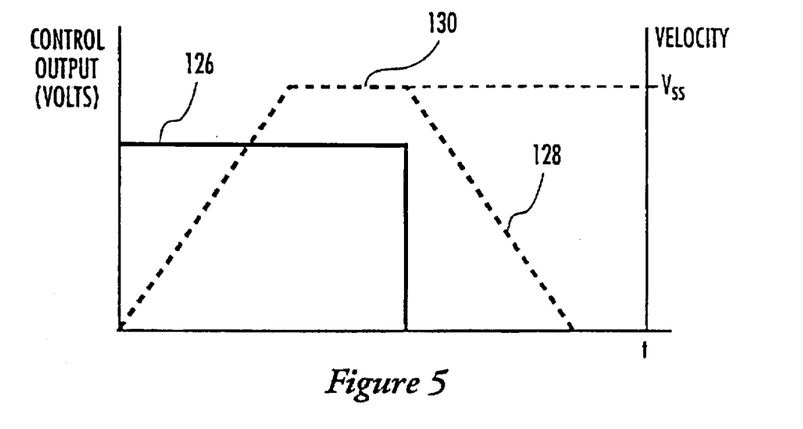
FIG. 5 is a graphical representation of control signals transmitted to a servo amplifier of the control system of FIG. 1 and of the velocity profile of the axis actuator during a first motion event in accordance with the present tuning technique, used to determine a scaling factor for the servo amplifier.

At step 98, with the preferred direction, damping factor, and travel and velocity limits thus selected, the control signal generating circuit 80 develops a tuning control signal and central processing circuit 68 applies the control signals, through D/A converter 67, to servo amplifier 18 to accelerate and decelerate actuator 20 through a first motion event as follows. The profiles of the control signal and actuator velocity are illustrated graphically in FIG. 5 as solid line 126 and broken line 128 respectively. As shown in FIG. 5, controller 16 applies a control signal to actuator 20 at a constant level $V_{out}$ to cause actuator 20 to accelerate up to a steady state velocity corresponding to the control signal level. In the presently preferred embodiment, the control signal output during this motion event is set the lesser of 85% of the maximum analog velocity command or 85% of the upper velocity limit $V_{lim}$ set at step 92. In response to this control signal, actuator 20 accelerates to a steady state velocity $V_{ss}$, indicated by flat section 130 of profile 128. During this motion event, central processing circuit 68 monitors feedback signals from device 40 and calculates the velocity of actuator 20 by differentiating the position feedback signals over its cycling time intervals. By comparing the resulting velocity values, central processing circuit 68 detects the point at which actuator 20 stops accelerating, and is able to calculate the steady state velocity $V_{ss}$ of actuator 20 for the control signal level $V_{out}$, as indicated at step 100. Once this velocity has stabilized, controller 16 terminates the command signal to decelerate actuator 20 to a stop.

At step 102, based upon the control signal applied during step 98 and the steady state velocity achieved, the central processing circuit 68 calculates a scaling factor $K_s$ for the axis in accordance with the relationship:

$$K_s = V_{out}/V_{ss} \qquad (1).$$

This scaling factor permits controller 16 to drive actuator 20 at predictable velocities, effectively compensating for the gain of servo amplifier 18.

Figure 6:
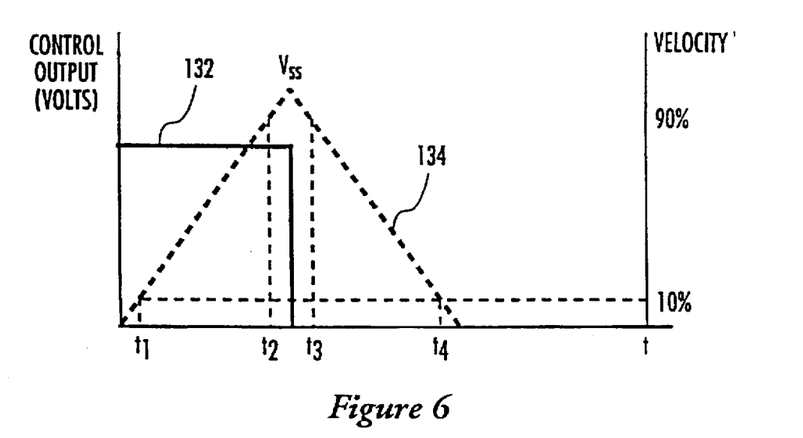
FIG. 6 is a graphical representation of control signals and the actuator velocity profile during a second motion event in accordance with the present tuning technique, used to determine system dynamic characteristics.

At step 104, central processing circuit 68 generates a second control signal and applies it through D/A converter 67 and servo amplifier 18 to drive actuator 20 through a second motion event for determining system dynamic characteristics. The profiles of the control signal and actuator velocity during this second motion event are illustrated graphically in FIG. 6. As shown in FIG. 6, controller 16 commands actuator 20 to accelerate at a constant rate to a known velocity by applying a constant-level control signal represented by solid line 132. In response to this signal, actuator 20 accelerates to the desired velocity as indicated by broken line 134. The control signal level used for this second motion event may be $V_{out}$ as used in the previous motion event. However, the signal is applied for a shorter duration than in the previous motion event, accelerating actuator 20 to its corresponding steady state velocity $V_{ss}$, then decelerating actuator 20 back to a stop. Throughout this motion event feedback signals from device 40 are monitored by controller 16 and velocity values are generated by differentiating these feedback signals as described above. In addition to these velocity values, central processing circuit 68 monitors several key times at which known velocity levels are reached. In particular, as illustrated in FIG. 6, central processing circuit 68 monitors and records times $t_1$, $t_2$, $t_3$ and $t_4$ at which actuator 20 reaches 10% and 90% of the steady state velocity $V_{ss}$ during both acceleration and deceleration in response to the control signal $V_{out}$ applied during the motion event.

At step 106, central processing circuit 68 determines system dynamic characteristics from the information collected during the second motion event. First, from the recorded times $t_1$, $t_2$, $t_3$ and $t_4$ central processing circuit 68 calculates acceleration and deceleration times $t_a$ and $t_d$ respectively as follows:

$$t_a = t_2 - t_1 \qquad (2);$$

$$t_d = t_4 - t_3 \qquad (3).$$

Using these acceleration and deceleration times, central processing circuit 68 calculates maximum system acceleration and deceleration rates in accordance with the relationships:

$$Maxaccel = 0.85*(V/t_a) \qquad (4);$$

$$Maxdecel = 0.85*(V/t_d) \qquad (5);$$

where V is 80% of the steady state velocity $V_{ss}$. It will be noted that in this preferred technique, the spans of velocity between 10% and 90% of the steady state velocity $V_{ss}$ are used to calculate the maximum acceleration and deceleration rates to avoid distortional effects of acceleration changes at the beginning and end of the acceleration and deceleration phases of the motion event. Moreover, in the preferred embodiment, the maximum acceleration and deceleration rates are set to 85% of their full scale values. Other limits on acceleration and deceleration could, of course, be imposed.

Figure 7:
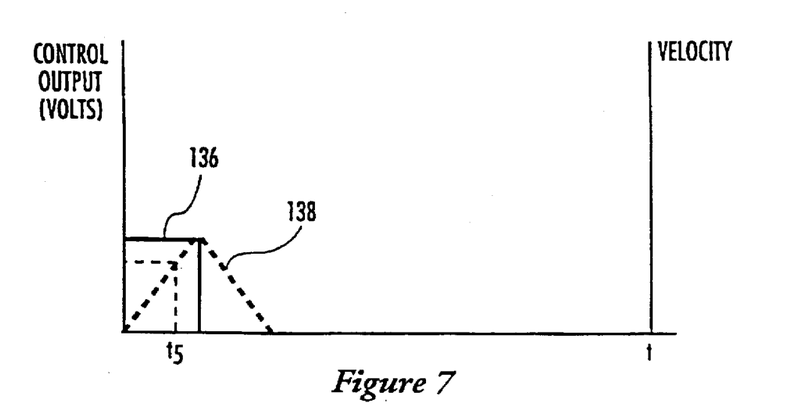
FIG. 7 is a graphical representation of control signals and the actuator velocity profile during a third motion event in accordance with the present tuning technique, used to determine velocity rise time as a bases for determining appropriate gain levels.

At step 108, central processing circuit 68 generates a control signal for a third motion event and applies the signal to actuator 20 through D/A converter 67 and servo amplifier 18. This control signal and the velocity profile produced by actuator 20 in response to it are graphically illustrated in FIG. 7. As shown in FIG. 7, the control signal used to produce the third motion event, represented by the solid line 136, is preferably of smaller amplitude and duration than the control signals used in the previous motion events. The third motion event is designed to measure the velocity rise time for the axis in response to the control signal, which is later used to determine the velocity loop servo bandwidth and the position loop gains as described below. In doing so, the amplitude control signal applied to produce the motion event is preferably kept relatively small to minimize the effect of the acceleration and deceleration limits of the drive on the rise time measurement. To accomplish this, central processing circuit 68 generates a value for the analog velocity command that will result in a velocity of approximately 30 counts per millisecond and guarantee at least 10 time samples at 1 millisecond per sample.

The velocity produced as a result of the control signal in illustrated by broken line 138 in FIG. 7. As in the previous motion events, central processing circuit 68 monitors feedback signals from device 40 throughout the event and generates velocity values by differentiating the position feedback signals over the sample intervals of controller 16.

At step 110, central processing circuit 68 determines the rise time $t_{rise}$ for the drive by detecting and recording the time $t_5$ at which actuator 20 reaches 90% of the commanded velocity.

At step 112, central processing circuit 68 determines the velocity loop bandwidth B, from this rise time in accordance with the approximate relationship:

$$B_v = 2/t_{rise} \qquad (6).$$

The velocity loop bandwidth $B_v$ is then used to determine the appropriate position loop gain levels as discussed below. The particular approach adopted by the present tuning technique for determining the position loop gain levels is based upon key relationships between the position and velocity loops when properly tuned. More specifically, in accordance with the present technique, it is preferable to tune the position loop gains to maintain a desired relationship between the position and velocity loop bandwidths given by the equation:

$$B_p = 1/16 * (B_v/Z^4) \qquad (7);$$

where $B_p$ is the position loop bandwidth and Z is the damping factor discussed above with respect to step 94.

Applying this preferred relationship, at step 114, central processing circuit 68 determines the position loop proportional gain $K_{p(pos)}$ in accordance with the relationship:

$$K_p(pos) = (B_v * C_p)/(16 * Z^4) \qquad (8);$$

where $C_p$ is a position accumulator constant. The position accumulator constant $C_p$ is generally a conversion factor for relating position or displacement to velocity and will generally be known by the control system. For example, for rotational actuators such as DC motors, the position accumulator constant will typically be expressed in terms of revolutions per thousand RPM-second (rev/KRPM-sec).

At step 116, controller 16 prompts the operator to select whether a position loop integrator block 50 (see FIG. 2) is desired. If so, central processing circuit 68 generates a position loop integral gain value $K_{i(pos)}$ at step 120, in accordance with the following relationship:

$$K_{i(pos)} = 0.25 * (1/C_p) * K_{p(pos)}^2 \qquad (9).$$

If a position loop integral gain block is not desired, central processing circuit 68 sets the position loop integral gain value equal to zero and proceeds to step 120. At step 120, central processing circuit 68 sets a velocity command feedforward gain value $K_{ff}$ if desired. In the presently preferred embodiment, where a feedforward gain is desired, central processing circuit 68 sets this gain at unity. Where no velocity command feedforward is desired, the gain value is set equal to zero. Controller 16 may be programmed to prompt an operator response regarding whether to include velocity command feedforward.

At step 122, the values set during the tuning sequence, including the gain values and system dynamic limits, are displayed on monitor 26 for review. At this point, the gain values and system limits may be altered if desired or may be confirmed at the values determined by central processing circuit 68. All values set during the tuning sequence are then saved in memory circuit 72. At step 124, central processing circuit 68 exits the tuning sequence and is free either to tune another axis by returning to step 82 or to proceed with normal execution of the control routine stored in memory circuit 70. The tuned axis is now application ready.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, as an alternative to the scaling factor $K_s$ described above, each of the gain values determined subsequently for the position loop may be scaled individually, effectively doing away with the overall scaling factor $K_s$. However, the use of a single scaling factor for all system gains permits an identical control routine to be implemented for axes configured as external velocity loop servo drives and for axes configured as torque loop servo drives, the former having an open velocity feedback path and the latter having a closed velocity feedback path as described above.

I claim:

1. A method for tuning a motion control system of the type including an input device for generating position command signals, an actuator for displacing a physical element to a desired location in response to drive signals, a servo amplifier circuit implementing a velocity control loop for converting control signals to drive signals for driving the actuator, a sensor for generating feedback signals representative of the position of the physical element, and a controller coupled to the input device, the sensor and the amplifier circuit for processing the command and feedback signals and generating the control signals, the controller implementing a position control loop wherein at least one parameter error signal derived from the command and feedback signals is multiplied by a position loop gain value, the method including the steps of:

(a) applying a control signal at a predetermined level to the amplifier circuit to accelerate the actuator in a predetermined direction;

(b) monitoring the feedback signals from the sensor during acceleration of the actuator;

(c) generating a value representative of velocity loop bandwidth based upon the feedback signals; and (d) generating a desired value for the position loop gain value based upon velocity loop bandwidth value.

2. The method of claim 1, wherein the velocity loop bandwidth value is generated based upon a rise time value determined from the feedback signals.

3. The method of claim 1, wherein the position loop gain value is a position loop proportional gain value and the error signal is representative the difference between the position command signals and the feedback signals.

4. The method of claim 1, wherein the predetermined level of the control signals applied at step (a) is determined based upon a scaling factor for the amplifier circuit.

5. The method of claim 1, wherein step (d) includes generating a position loop proportional gain value and a position loop integral gain value.

6. A method for tuning a motion control system of the type including an input device for generating position command signals, an actuator for displacing a physical element to a desired location in response to drive signals, a servo amplifier circuit implementing a velocity control loop for converting control signals to drive signals for driving the actuator through multiplication of the drive signals by a scaling factor, a sensor for generating feedback signals representative of the position of the physical element, and a controller coupled to the input device, the sensor and the amplifier circuit for processing the command and feedback signals and generating the control signals, the method including the steps of:

(a) applying a control signal at a predetermined level to the amplifier circuit to drive the actuator at a steady state velocity;

(b) monitoring the feedback signals;

(c) generating a value representative of the steady state velocity based upon the feedback signals; and (d) generating the scaling factor from the predetermined level of the control signals and from the steady state velocity value.

7. The method of claim 6, wherein the controller implements a position control loop wherein at least one position error value is multiplied by a predetermined gain value, the method including the further steps of applying a control signal to the amplifier circuit to accelerate the actuator in a predetermined direction, monitoring the feedback signals from the sensor during acceleration of the actuator and generating a desired value for the gain based upon the feedback signals.

8. The method of claim 7, wherein the feedback signals are used to generate a value representative of velocity loop bandwidth and the desired value for the gain is derived from the velocity loop bandwidth value.

9. The method of claim 8, wherein the velocity loop bandwidth value is generated based upon a rise time value and derived from the feedback signals.

10. The method of claim 7, wherein the gain value is a position loop proportional gain value.

11. The method of claim 6 including the further steps of applying control signals to the amplifier circuit to accelerate and decelerate the actuator, monitoring the feedback signals during acceleration and deceleration of the actuator and generating values representative of maximum system acceleration and deceleration rates based upon the feedback signals.

12. An apparatus for tuning a motion control system of the type including an input device for generating position command signals, an actuator for displacing a physical element to a desired location in response to drive signals, a servo amplifier circuit implementing a velocity control loop for converting control signals to drive signals for driving the actuator, a sensor for generating feedback signals representative of the position of the physical element, and a controller coupled to the input device, the sensor and the amplifier circuit for processing the command and feedback signals and generating the control signals, the controller implementing a position control loop wherein at least one parameter error signal derived from the command and feedback signals is multiplied by a position loop gain value, the apparatus comprising:

a control signal generating circuit coupled to the amplifier circuit and configured to generate and apply a control signal to the amplifier circuit to accelerate the actuator during a tuning sequence;

a monitoring circuit coupled to the sensor for monitoring the feedback signals during the tuning sequence;

a signal processing circuit coupled to the monitoring circuit and configured to generate a velocity loop bandwidth value based upon the feedback signals monitored during the tuning sequence and to derive the position loop gain value from the velocity loop bandwidth value; and a memory circuit for storing the position loop gain value.

13. The apparatus of claim 12, wherein the control signal generating circuit, the signal processing circuit and the memory circuit are included in a programmed microprocessor.

14. The apparatus of claim 12, wherein the signal processing circuit is configured to generate a rise time value based upon the feedback signals monitored during the tuning sequence and to derive the velocity loop bandwidth value from the rise time value.

15. The apparatus of claim 12, wherein the actuator includes an electric motor.

16. The apparatus of claim 12, wherein the sensor includes a quadrature-type incremental encoder.

17. The apparatus of claim 12, further comprising an operator interface coupled to the signal processing circuit for monitoring operation of the controller.

* * * * *